(12) United States Patent
Tsukamoto et al.

(10) Patent No.: US 10,260,393 B2
(45) Date of Patent: Apr. 16, 2019

(54) EXHAUST GAS PURIFICATION APPARATUS FOR INTERNAL COMBUSTION ENGINE

(71) Applicant: TOYOTA JIDOSHA KABUSHIKI KAISHA, Toyota-shi, Aichi-ken (JP)

(72) Inventors: Yoshihisa Tsukamoto, Susono (JP); Hirotaka Saitoh, Sunto-gun (JP); Yuriko Hagimoto, Susono (JP); Junichi Matsuo, Gotenba (JP); Yasumasa Notake, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 33 days.

(21) Appl. No.: 15/433,533

(22) Filed: Feb. 15, 2017

(65) Prior Publication Data

US 2017/0234187 A1  Aug. 17, 2017

(30) Foreign Application Priority Data

Feb. 17, 2016  (JP) .................................. 2016-027750

(51) Int. Cl.
  *F01N 9/00* (2006.01)
  *F01N 3/20* (2006.01)

(52) U.S. Cl.
  CPC ............... *F01N 3/208* (2013.01); *F01N 9/00* (2013.01); *F01N 2610/02* (2013.01); *F01N 2610/11* (2013.01); *F01N 2610/144* (2013.01); *F01N 2610/1406* (2013.01); *F01N 2610/146* (2013.01); *F01N 2610/1473* (2013.01); *F01N 2610/1493* (2013.01); *F01N 2900/0422* (2013.01); *F01N 2900/08* (2013.01); *F01N 2900/1404* (2013.01); *Y02T 10/24* (2013.01); *Y02T 10/47* (2013.01)

(58) Field of Classification Search
  CPC ..... F01N 2610/1473; F01N 2610/1493; F01N 2610/146
  See application file for complete search history.

(56) References Cited

U.S. PATENT DOCUMENTS

| | | | | |
|---|---|---|---|---|
| 2007/0283685 | A1* | 12/2007 | Ripper | B01D 53/90 60/288 |
| 2009/0114864 | A1* | 5/2009 | Scheffer | F01N 3/0842 251/129.15 |

(Continued)

FOREIGN PATENT DOCUMENTS

| | | |
|---|---|---|
| EP | 2 535 538 A1 | 12/2012 |
| JP | 2008-101564 | 5/2008 |

(Continued)

*Primary Examiner* — Patrick D Maines
(74) *Attorney, Agent, or Firm* — Finnegan, Henderson, Farabow, Garrett & Dunner, LLP

(57) ABSTRACT

An object is to prevent abrasion inside an addition valve and clogging of the addition valve due to an increase in the particle diameter of precipitates. A first control is performed by which a pump is caused to operate in such a way as to return urea solution contained in the addition valve and a urea solution channel to a tank by a predetermined quantity. After the lapse of a certain time after the end of the first control, a second control is performed by which the pump is caused to operate in such a way as to return the urea solution remaining in the addition valve and the urea solution channel thoroughly to the tank.

6 Claims, 12 Drawing Sheets

(56) References Cited

U.S. PATENT DOCUMENTS

2010/0307142 A1* 12/2010 Habumuremyi ........ F01N 3/208
60/295
2011/0000196 A1* 1/2011 Kasahara .............. F01N 3/2066
60/286

FOREIGN PATENT DOCUMENTS

| JP | 2015-078611 A | 4/2015 | |
|----|----|----|----|
| JP | 2015-78643 | 4/2015 | |
| WO | WO-2006064028 A1 * | 6/2006 | ......... B01D 53/9431 |
| WO | WO 2011/096086 A1 | 8/2011 | |
| WO | WO 2013/051315 A1 | 4/2013 | |

* cited by examiner

[Fig. 1]
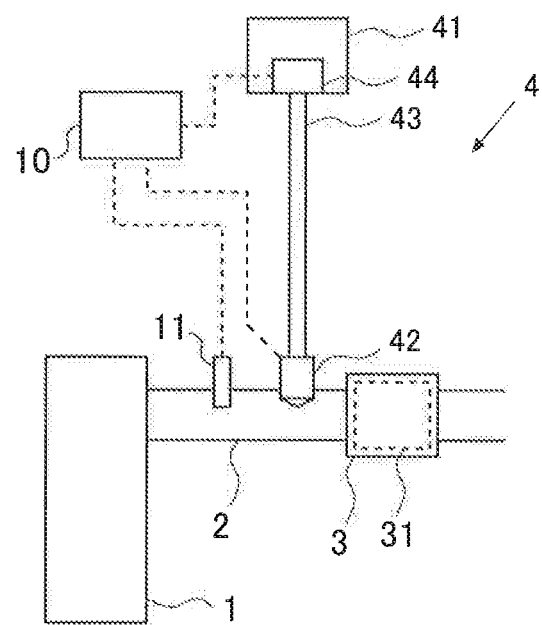

[Fig. 2]
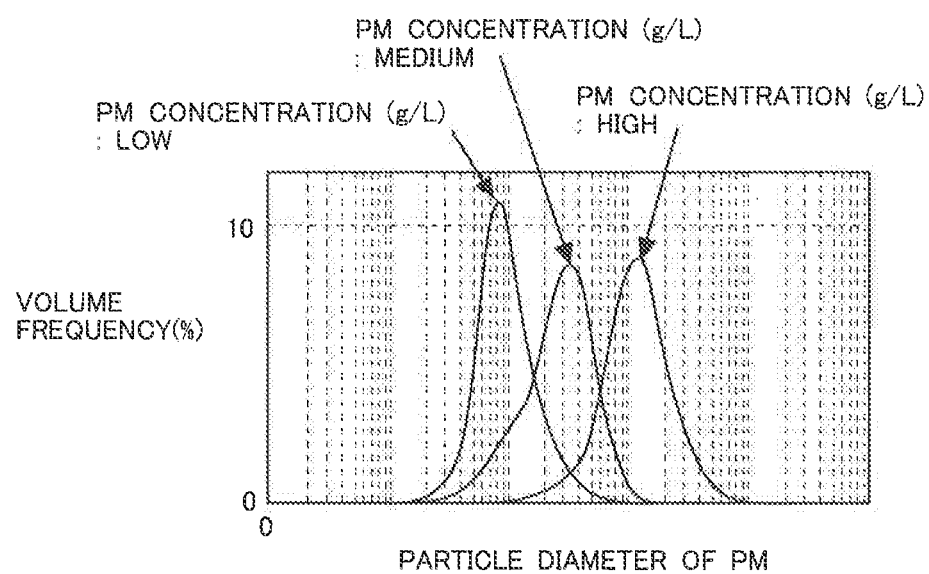

[Fig. 3]
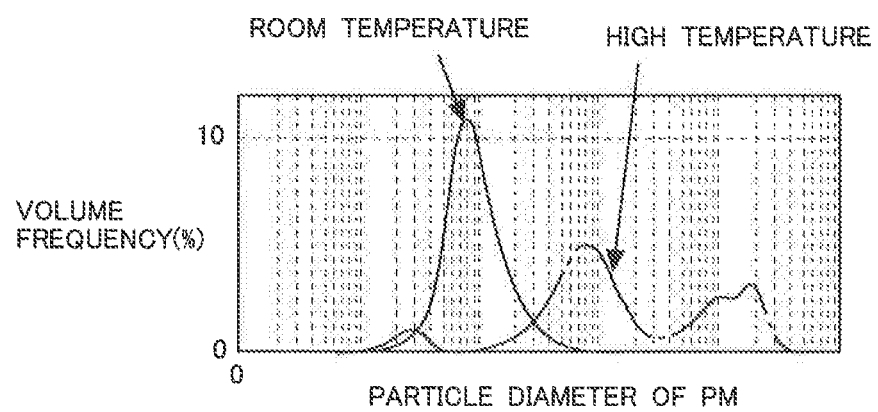

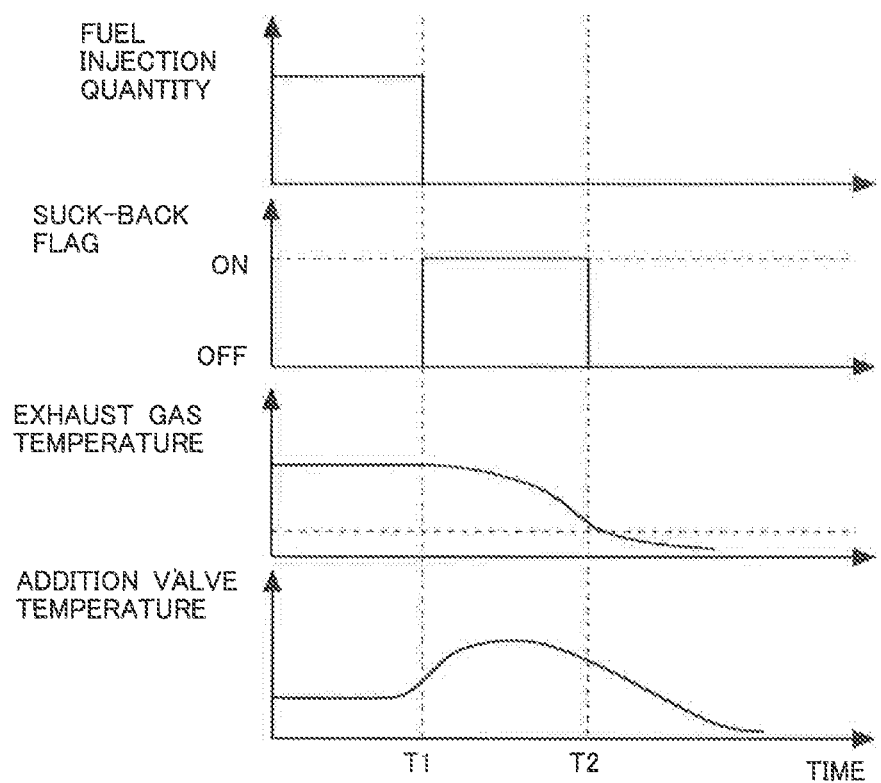

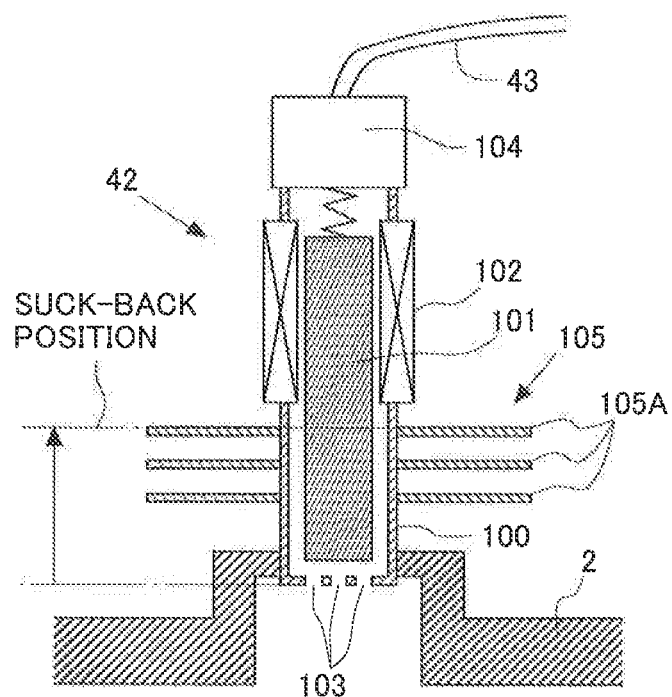
[Fig. 5]

[Fig. 6]
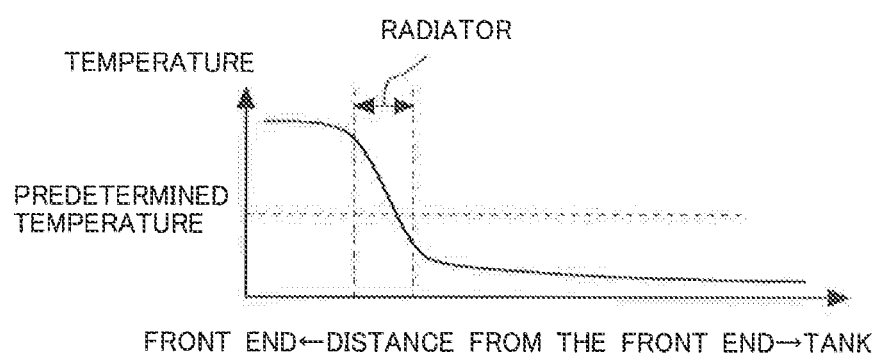

[Fig. 7]
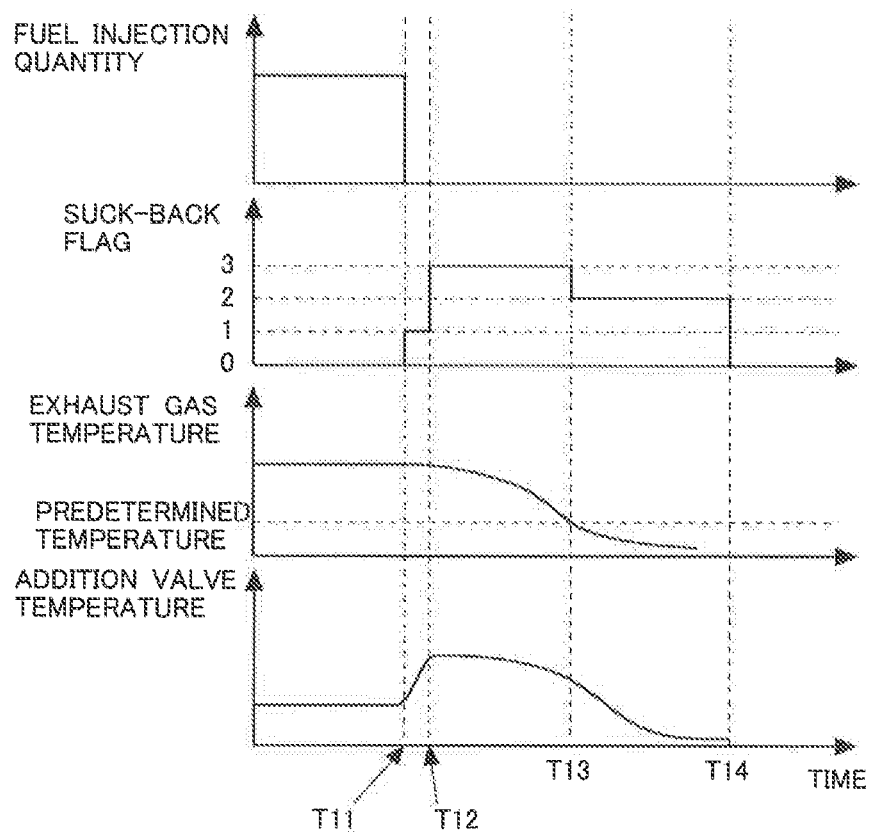

[Fig. 8]
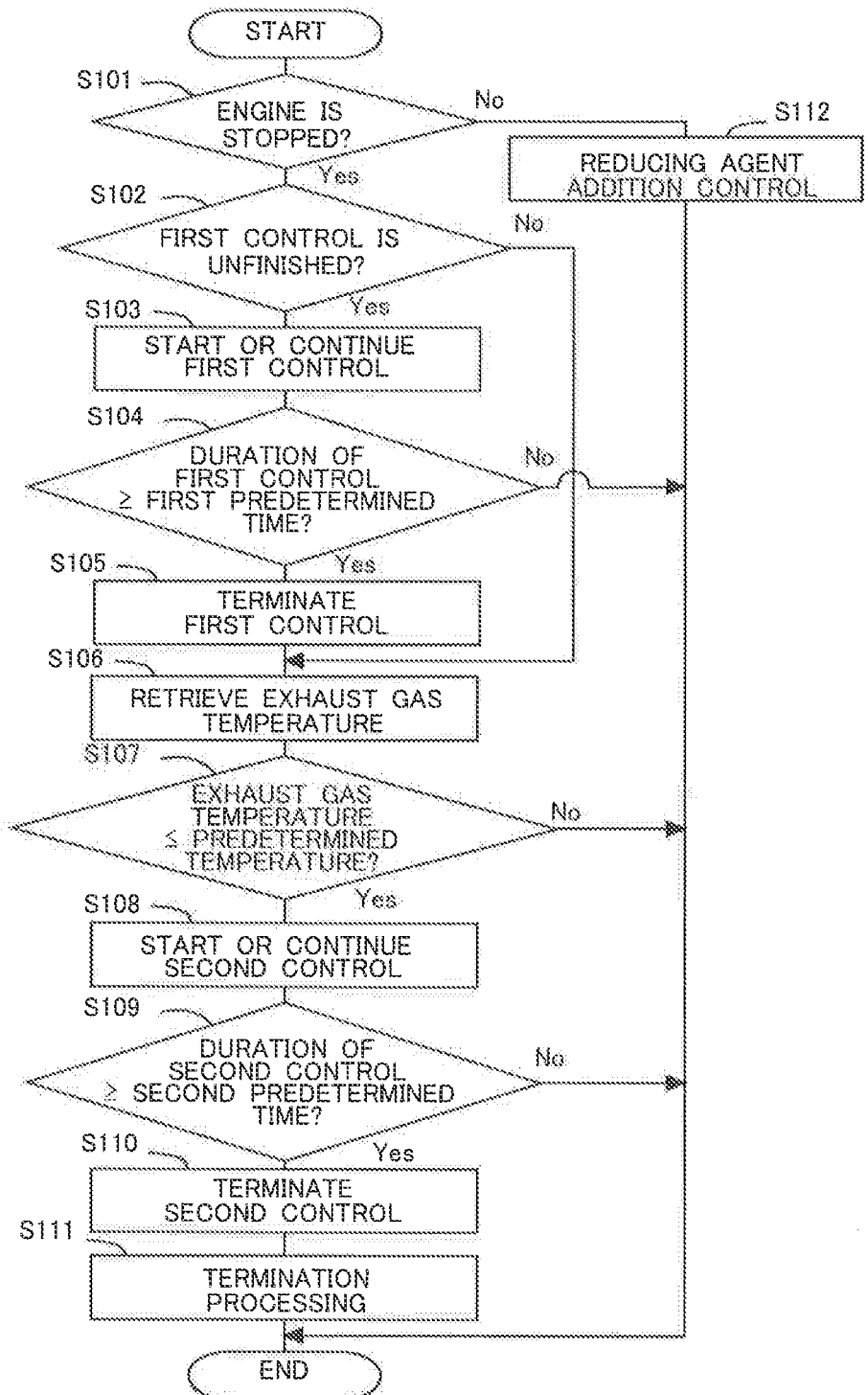

[Fig. 9]
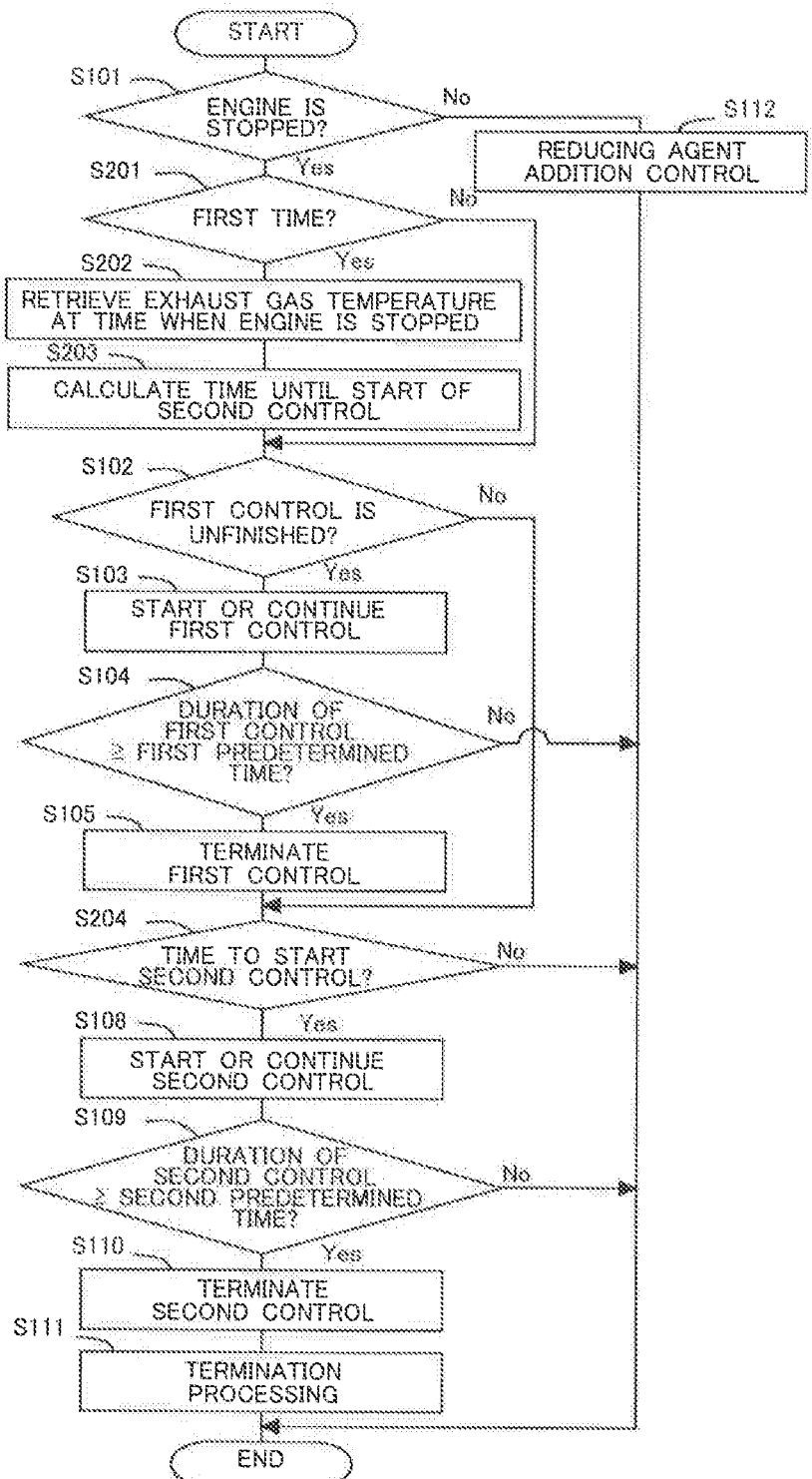

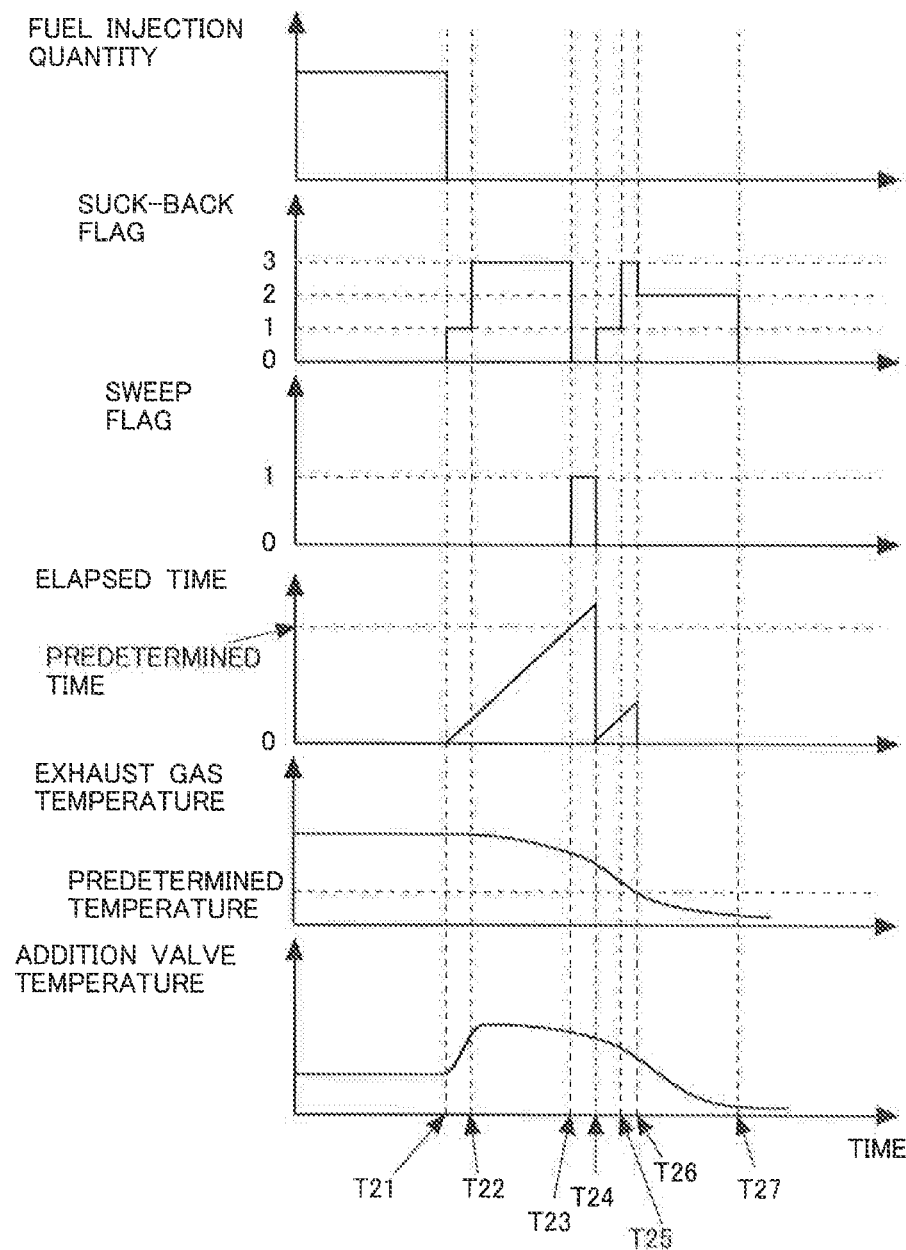
[Fig. 10]

[Fig. 11]
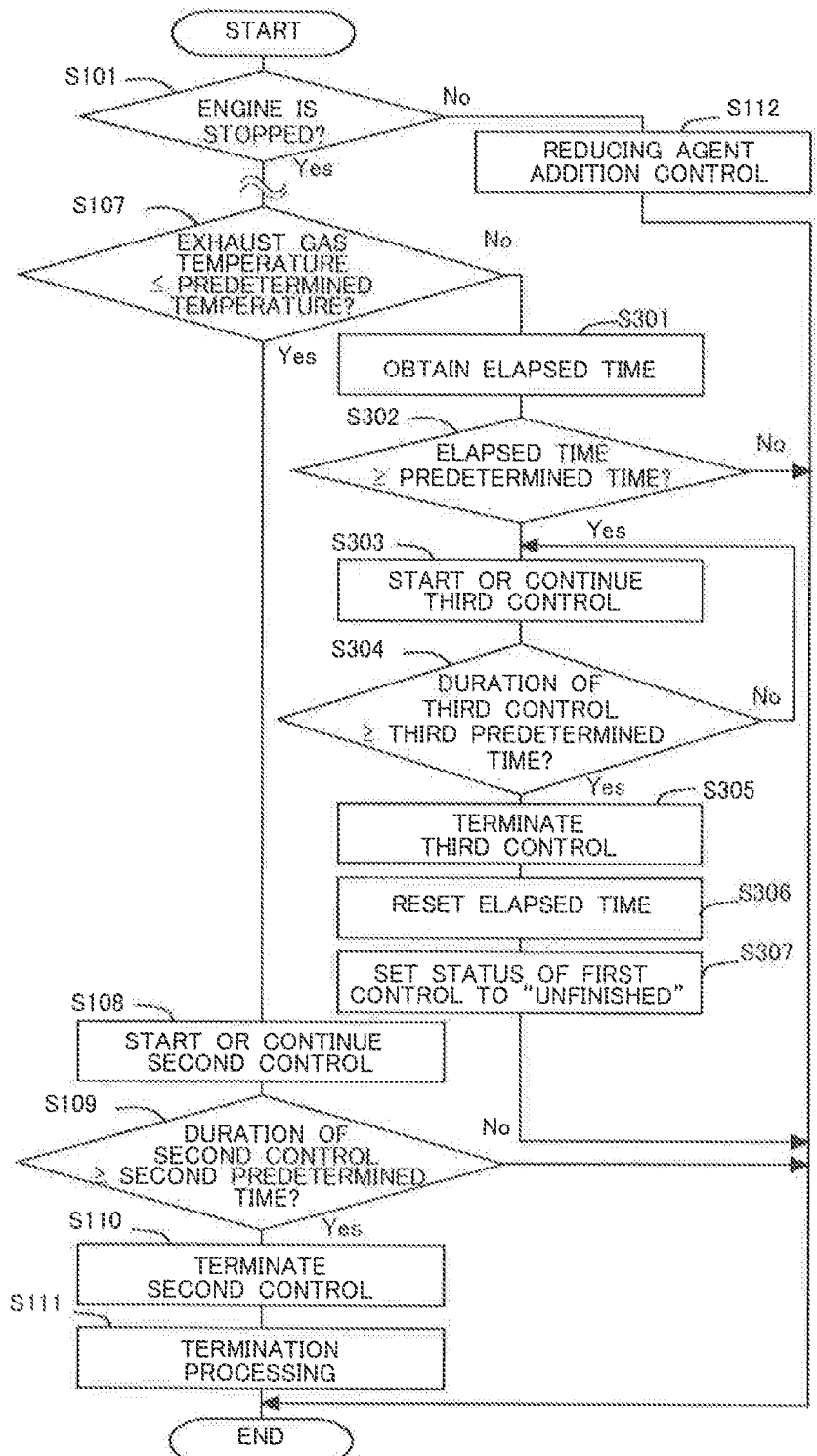

[Fig. 12]
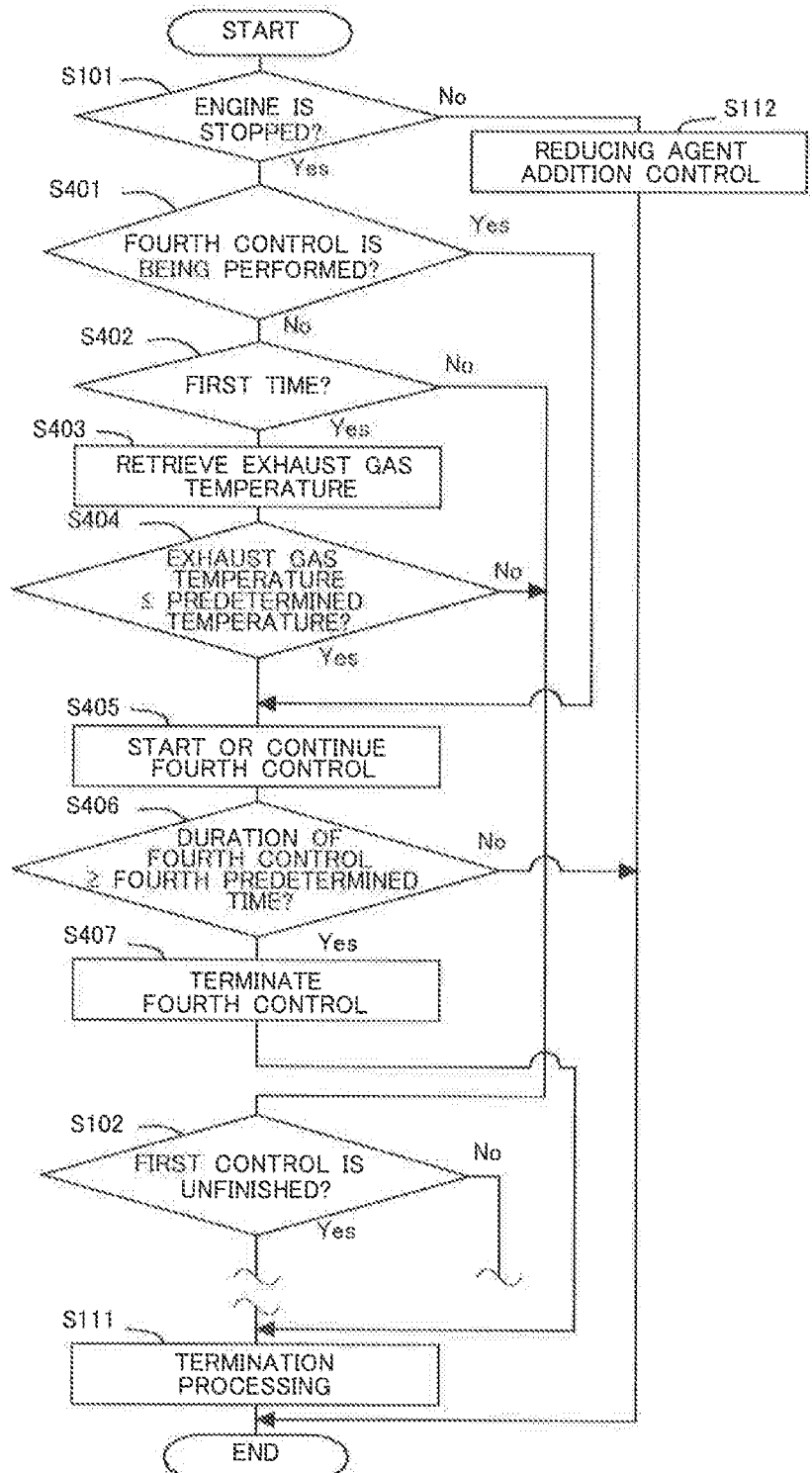

EXHAUST GAS PURIFICATION APPARATUS FOR INTERNAL COMBUSTION ENGINE

CROSS REFERENCE TO RELATED APPLICATIONS

This application claims priority to Japanese Patent Application No. 2016-027750 filed on Feb. 17, 2016, the entire contents of which are incorporated by reference herein.

TECHNICAL FIELD

The present disclosure relates to an exhaust gas purification apparatus for an internal combustion engine.

BACKGROUND ART

A selective catalytic reduction NOx catalyst (which will be sometimes referred to as "SCR catalyst" hereinafter) is known to purify NOx contained in exhaust gas of an internal combustion engine using ammonia as reducing agent. It is known to use an SCR catalyst supported on a filter that traps particulate matter (which will be hereinafter referred to as "PM") in the exhaust gas. In some cases, an addition valve for supplying urea solution (aqueous solution) to the exhaust gas is provided upstream of the SCR catalyst. Urea solution added to the exhaust gas is hydrolyzed by the heat of the exhaust gas and/or the heat of the SCR catalyst to produce ammonia, which is adsorbed by the SCR catalyst.

Urea solution freezes at, for example, approximately −11° C. When the outside air temperature is low, there is a possibility that urea solution may freeze in the addition valve and/or in a channel for supplying urea solution after the internal combustion engine is stopped. Freezing of urea solution can make it impossible to supply urea solution after the start of the internal combustion engine and/or cause breakage of the addition valve or the channel for supplying urea solution. After the internal combustion engine is stopped, the addition valve receives heat from the exhaust gas and components around the addition valve, so that the temperature of the addition valve temporarily becomes higher than its temperature during the operation of the internal combustion engine. If urea solution remains in the addition valve in such an occasion, precipitates may be produced in the addition valve from the urea solution, which can cause abrasion of sliding parts in the addition valve or clogging of the addition valve. Moreover, the rise in the temperature of the addition valve after the stop of the internal combustion engine sometimes leads to hydrolysis of urea inside the addition valve, producing ammonia. It is possible that ammonia thus produced may cause corrosion of the addition valve.

A conventional countermeasure to the above problem is to suck urea solution remaining in the addition valve and the channel for supplying urea solution back into a tank after the internal combustion engine is stopped (see, for example, PTL 1 in the following list).

CITATION LIST

Patent Literature

PTL 1: Japanese Patent Application Laid-Open No. 2008-101564
PTL 2: Japanese Patent Application Laid-Open No. 2015-078643
PTL 3: WO/2013/051315

SUMMARY

Technical Problem

When urea solution is sucked back into the tank, the addition valve is opened. Consequently, exhaust gas of the internal combustion engine flows into the addition valve from the exhaust gas passage. In other words, the urea solution in the addition valve and the channel for supplying urea solution is replaced by the exhaust gas of the internal combustion engine. If the exhaust gas in the surroundings of the addition valve contains PM, the PM in the exhaust gas is likely to be sucked into the addition valve together with the exhaust gas in the exhaust passage, when urea solution is sucked back into the tank immediately after the internal combustion engine is stopped. It should be noted that even after urea solution in the addition valve has been sucked back into the tank, a very small quantity of urea solution remains in the addition valve, because it is impossible to remove urea solution completely from, for example, spaces in sliding parts in the addition valve. Moreover, since the temperature of the exhaust gas in the exhaust passage is still high at the time immediately after the internal combustion engine is stopped, sucking the high-temperature exhaust gas back into the addition valve leads to a rise in the temperature of the addition valve. Thus, when urea solution is sucked back immediately after the stop of the internal combustion engine, the temperature of the addition valve becomes high, and the temperature of the urea solution remaining in spaces in sliding parts of the addition valve also becomes high consequently. Moreover, PM can mix with the high-temperature urea solution. It has been found that under the presence of urea solution at high temperature, aggregation of PM is promoted by urea solution, making clogging of the addition valve and abrasion of sliding parts of the addition valve more likely to be caused. It is considered that the particle diameter of PM is increased by urea solution, and the particle diameter of precipitates derived from urea is increased by PM. Hence, every particle produced is considered to be a mixture of precipitates derived from urea and PM. Therefore, in the following description the particles produced will be described as participates.

Sucking the high-temperature exhaust gas into the addition valve leads to a rise in the temperature of the addition valve and the production of precipitates derived from the urea solution remaining in the addition valve. It has also been found that if precipitates are produced under the presence of PM, PM causes the precipitates to aggregate, leading to an increase in the particle diameter of the precipitates. Moreover, precipitates derived from urea solution include materials insoluble in water. If precipitates insoluble in water are produced in the addition valve and the diameter of the precipitates increase to become larger than the diameter of the discharge port, it is difficult to remove the precipitates from inside the addition valve even by flowing urea solution through the addition valve afterward because of the insolubility of the precipitates. Therefore, there is a possibility that the precipitates may cause abrasion inside the addition valve and/or clogging of the addition valve. In the case where a filter is not provided in the exhaust passage upstream of the addition valve, the particle diameter of the precipitates increases more greatly because a larger amount of PM is sucked into the addition valve. Even in the case where a filter is provided upstream of the addition valve, it is difficult to trap PM thoroughly by the filter. Moreover, sucking high-temperature exhaust gas into the addition valve can cause the production of precipitates in the addition valve. Thus, even in the case where urea solution is sucked back into the tank, it is possible that the particle diameter of the precipitates may increase due to urea solution remaining in the addition valve and PM sucked into the addition valve. This can lead to abrasion inside the addition valve and/or clogging of the addition valve.

The present disclosure has been made in view of the above-described problem, and an object of the present disclosure is to prevent or reduce abrasion inside the addition valve and clogging of the addition valve that may be caused by an increase in the particle diameter of the precipitates.

Solution to Problem

According to the present disclosure that is intended to solve the above problem, there is provided an exhaust gas purification apparatus for an internal combustion engine comprising an addition valve configured to supply urea solution into an exhaust passage of an internal combustion engine, a tank that configured to contain urea solution, a urea solution channel configured to connect said addition valve and said tank, through which urea solution flows, a pump configured to cause urea solution to flow in the urea solution channel, a selective catalytic reduction NOx catalyst provided in the exhaust passage downstream of said addition valve and configured to remove NOx using urea solution, and a controller configured to perform, after said internal combustion engine is stopped, a first control by which said pump is caused to operate in such a way as to return urea solution contained in said addition valve and said urea solution channel to said tank by a predetermined quantity and to stop thereafter and to perform a second control by which said pump is caused to operate in such a way as to return urea solution remaining in said addition valve and said urea solution channel thoroughly to said tank, after the lapse of a certain time after the end of the first control.

After the internal combustion engine is stopped, the supply of urea solution through the addition valve is stopped, and therefore the heat absorbed from the addition valve by urea solution decreases. Moreover, heat is transferred to the addition valve from the exhaust gas and the exhaust passage. Therefore, the temperature of the addition valve is apt to rise. The temperature of the addition valve rises most in its front end portion, because the front end portion is exposed to the exhaust gas of the internal combustion engine. By returning urea solution in the addition valve and the urea solution channel to the tank by a predetermined quantity by performing the first control after the internal combustion engine is stopped, urea solution can be kept away from the front end portion of the addition valve, which has the highest temperature. Thus, a rise in the temperature of urea solution can be prevented or reduced. Consequently, the production of precipitates can be reduced. Furthermore, the production of ammonia from urea solution in the addition valve can be prevented or reduced. Since the quantity of exhaust gas of the internal combustion engine flowing into the addition valve from the exhaust passage by the first control can be limited, the quantity of PM entering the addition valve can be reduced. Therefore, by performing the first control, it is possible to prevent or reduce the production of ammonia in the addition valve while controlling an increase in the particle diameter of the precipitates. Thus, the predetermined quantity is set as a quantity of sucked back urea solution that enables prevention or reduction of the production of ammonia and keeps the particle diameter of the precipitates within an allowable range. By the first control, the urea solution in the addition valve and the urea solution channel is not brought back into the tank thoroughly, but a certain quantity of urea solution remains in the addition valve and/or the urea solution channel. In other words, the first control excludes the returning of the entirety of the urea solution in the addition valve and the urea solution channel back to the tank. Therefore, the predetermined quantity is set smaller than the capacity of the addition valve and the urea solution channel.

By performing the second control thereafter, freezing of urea solution in the addition valve or the urea solution channel can be prevented. Since the second control is performed after the lapse of a certain time after the end of the first control, the exhaust gas temperature is lower at the beginning of the second control than at the end of the first control. Hence, high-temperature exhaust gas can be prevented from being sucked into the addition valve when the second control is performed. Moreover, since the concentration of PM in the exhaust passage decreases with the lapse of time, the concentration of PM is lower at the beginning of the second control than at the end of the first control. Hence, the quantity of PM sucked into the addition valve by the second control can be made smaller. Therefore, when the second control is performed, an increase in the particle diameter of the precipitates in the addition valve can be controlled, and abrasion inside the addition valve and clogging of the addition valve can be prevented.

Said controller may be configured to perform said first control on condition that the temperature of the exhaust gas in said exhaust passage at the time when said internal combustion engine is stopped is equal to or higher than a predetermined temperature.

The predetermined temperature is a temperature at which there is a possibility that the particle diameter of the precipitates in the addition valve may exceed an allowable range. The allowable range of the particle diameter of the precipitates is determined taking into consideration abrasion and clogging of the addition valve that can be caused. For example, if the particle diameter of the precipitates becomes larger than the diameter of the discharge port of the addition valve, clogging of the addition valve will occur. Therefore, the allowable range of the particle diameter of the precipitates is determined as a range smaller than the diameter of the discharge port of the addition valve so that clogging of the addition valve will not be caused. The particle diameter of the precipitates that is finally reached correlates with the exhaust gas temperature. Specifically, the lower the exhaust gas temperature is, the smaller the particle diameter of the precipitates that is finally reached is. Therefore, in the case where the exhaust gas temperature is lower than the predetermined temperature, there is no possibility that the particle diameter of the precipitates will increase beyond the allowable range even if the first control is not performed. Therefore, it is not necessary to perform the first control in this case. Therefore, the first control may be performed only in the case where the exhaust gas temperature at the time when the internal combustion engine is stopped is equal to or higher than the predetermined temperature. In the case where the first control is not performed, the second control is not performed also.

Said controller may be configured to start said second control after the temperature of the exhaust gas in said exhaust passage becomes lower than said predetermined temperature after said first control ends.

At the time when the first control ends, the exhaust gas temperature may be higher than or equal to the predetermined temperature in some cases. If the second control is performed in such cases, there is a possibility that the particle diameter of the precipitates in the addition valve may increase due to PM and the exhaust gas having a temperature higher than or equal to the predetermined temperature flowing into the addition valve. Starting the second control after the exhaust gas temperature becomes lower than the predetermined temperature after the end of the first control can prevent PM and the exhaust gas having a temperature higher than or equal to the predetermined temperature from flowing into the addition valve. Therefore, an increase in the particle diameter of the precipitates in the addition valve can be controlled.

Said addition valve or said urea solution channel may be provided with a radiator that dissipates heat from said addition valve or said urea solution channel, and said controller may set said predetermined quantity in said first control equal to or larger than the capacity of a portion from a front end of said addition valve to the tank side end of said radiator.

The heat received by the front end portion of the addition valve is transferred to the radiator and then dissipated by the radiator. Hence, while the temperature of the radiator and the portion on the exhaust passage side of the radiator is high, the temperature of the portion on the tank side of the radiator is lower than the temperature of the radiator and the portion on the exhaust passage side of the radiator. Therefore, by returning urea solution back to the tank by a quantity at least equal to the capacity of the portion from the front end of the addition valve to the tank side end of the radiator by the first control, urea solution can be kept away from the portion having relatively high temperatures. Thus, a rise in the temperature of urea solution can be controlled, and therefore the production of ammonia and precipitates can be controlled.

When the time elapsed since the latest start of said first control becomes longer than a time taken for the particle diameter of precipitates to reach a specific particle diameter during the period from the latest end of said first control to the start of said second control, said controller may perform a third control by which said pump is caused to operate to discharge a quantity of urea solution equal to or larger than said predetermined quantity from said tank to said urea solution channel and thereafter perform said first control again.

The specific particle diameter mentioned above is the upper bound of the allowable range of the particle diameter of the precipitates. If the exhaust gas temperature continues to be high after the end of the first control and before the start of the second control, there is a possibility that the particle diameter of the precipitates produced from urea solution remaining in the addition valve may increase to exceed the allowable range. By discharging a quantity of urea solution equal to or larger than the predetermined quantity from the tank, a quantity of urea solution larger than the quantity of urea solution returned to the tank by the first control is discharged from the tank to the addition valve, so that urea solution is injected into the exhaust passage through the addition valve. Thereby, the precipitates can be discharged to the exhaust passage with urea solution. Thus, the precipitates can be discharged to the exhaust passage before the particle diameter of the precipitates increases to exceed the allowable range. By returning the predetermined quantity of urea solution to the tank again thereafter, the production of ammonia in the addition valve can be prevented, and the production of a large quantity of precipitates can be prevented.

If the temperature of the exhaust gas in said exhaust passage at the time when said internal combustion engine is stopped is lower than a predetermined temperature, said controller may cause said pump to operate in such a way as to return urea solution remaining in said addition valve and said urea solution channel thoroughly to said tank without performing said first control or said second control.

Depending on the operation state of the internal combustion engine before it is stopped, there may be cases where the exhaust gas temperature at the time when the internal combustion engine is stopped is low enough to prevent an increase in the particle diameter of the precipitates. In such cases, even if urea solution is returned back to tank thoroughly immediately after the internal combustion engine is stopped, the particle diameter of precipitates derived from urea solution remaining in spaces in the addition valve is unlikely to increase in the addition valve afterward. Therefore, it is sufficient to perform the control for returning the urea solution in the addition valve and the urea solution channel thoroughly once to prevent freezing of urea solution. Thus, returning of urea solution to the tank can be finished in a short time, allowing a reduction in the power consumption by the controller. The predetermined temperature is a temperature at which there is a possibility that the particle diameter of the precipitates in the addition valve may exceed an allowable range, as described above.

Advantageous Effects of Disclosure

The present disclosure enables prevention or reduction of abrasion inside the addition valve and clogging of the addition valve that may be caused by an increase in the particle diameter of the precipitates.

BRIEF DESCRIPTION OF DRAWINGS

FIG. 1 is a diagram showing the general configuration of the exhaust system of an internal combustion engine according to an embodiment.

FIG. 2 shows the result of an experiment conducted to examine how the particle diameter of PM varies depending on the variation in the concentration of PM when PM is mixed in area solution.

FIG. 3 shows the result of an experiment conducted to examine how the particle diameter of PM varies depending on the variation in the temperature when PM is mixed in urea solution.

FIG. 4 is a time chart in a case where a suck-back control is performed only once immediately after the internal combustion engine is stopped.

FIG. 5 is a cross sectional view of an addition valve and the exhaust passage 2 in the neighborhood of the addition valve in the system according to the embodiment.

FIG. 6 shows relationship between the distance from the front end of the addition valve and the temperature.

FIG. 7 is a time chart in a case where the first control and the second control are performed according to a first embodiment.

FIG. 8 is a flow chart of the process of the first control and the second control according to the first embodiment.

FIG. 9 is a flow chart of the process of the first control and the second control in the case where the time to start the second control is determined on the basis of the exhaust gas temperature at the time when the internal combustion engine 1 is stopped.

FIG. 10 is a time chart in the case where the first control, the second control, and the third control are performed according to a second embodiment.

FIG. 11 is a flow chart of the process of the first control, the second control, and the third control according to the second embodiment.

FIG. 12 is a flow chart of the process of the first control, the second control, and the fourth control according to a third embodiment.

DESCRIPTION OF EMBODIMENTS

In the following, embodiments of the present disclosure will be described specifically by way of example with reference to the drawings. The dimensions, materials, shapes, relative arrangements, and other features of the components that will be described in connection with the embodiments are not intended to limit the scope of the present disclosure only to them, unless particularly stated. It will be appreciated that features of the embodiments described below may be adopted in any feasible combination.

First Embodiment

FIG. 1 is a diagram showing the general configuration of the exhaust system of an internal combustion engine according to a first embodiment. The internal combustion engine 1 is a diesel engine for driving a vehicle. It will be appreciated that the internal combustion engine 1 according to the embodiment is not limited to a diesel engine, but it may be a gasoline or other engine.

The internal combustion engine 1 is connected with an exhaust passage 2. The exhaust passage 2 is provided with a filter 3 on which a selective catalytic reduction NOx catalyst 31 that selectively reduces NOx in the exhaust gas using ammonia as reducing agent is supported. The selective catalytic reduction NOx catalyst 31 will be hereinafter referred to as the "SCR catalyst 31". The filter 3 is a wall-flow filter, which traps PM in the exhaust gas. The SCR catalyst 31 adsorbs ammonia and reduces NOx in the exhaust gas using ammonia as reducing agent. While the SCR catalyst 31 is supported on the filter 3 in this embodiment, the filter 3 is not essential. The SCR catalyst 31 may be provided alone.

The exhaust passage 2 upstream of the SCR catalyst 31 is provided with an addition valve 42 that supplies reducing agent to the SCR catalyst 31. The addition valve 42 constitutes a part of a reducing agent supply device 4. The reducing agent supply device 4 includes a tank 41, the addition valve 42, a urea solution channel 43, and a pump 44.

The tank 41 contains urea solution (aqueous solution). The addition valve 42 is provided in the exhaust passage 2 upstream of the SCR catalyst 31. The urea solution channel 43 connects the tank 41 and the addition valve 42 to allow urea solution to flow through it.

The pump 44 is provided in the tank 41 to pump out urea solution. The pump 44 pumps urea solution from the tank 41 to the addition valve 42 when rotating in the forward direction and from the addition valve 42 to the tank 41 when rotating in the reverse direction. The pump 44 may be arranged in the urea solution channel 43 instead of inside the tank 41. The pump 44 is an electric pump which rotates with supply of electrical power. Therefore, the pump 44 can operate even while the internal combustion engine 1 is at rest. As the pump 44 rotates in the forward direction while the addition valve 42 is open, urea solution is pumped through the urea solution channel 43 and added to the exhaust gas. The urea solution added to the exhaust gas is hydrolyzed by the heat of the exhaust gas to produce ammonia. The ammonia thus produced is adsorbed by the SCR catalyst 31. The ammonia adsorbed in the SCR catalyst 31 serves as reducing agent to selectively reduce NOx in the exhaust gas. The exhaust passage 2 upstream of the addition valve 42 is provided with a temperature sensor 11, which measures the temperature of the exhaust gas.

An ECU 10 which is an electronic controller for controlling the internal combustion engine 1 is provided for the internal combustion engine 1 having the above-described configuration. The ECU 10 controls the internal combustion engine 1 in accordance with operation conditions of the internal combustion engine 1 and in response to requests made by the driver.

The ECU 10 is connected with the temperature sensor 11 by electrical wiring, and a signal output from the temperature sensor 11 is input to the ECU 10. While the internal combustion engine 1 is operating, the ECU 10 estimates the temperature of the addition valve 42 and the SCR catalyst 31 on the basis of the output signal of the temperature sensor 11. Alternatively, the temperature of the addition valve 42 and the SCR catalyst 31 may be estimated on the basis of the operation state of the internal combustion engine 1. The ECU 10 is connected also with the addition valve 42 and the pump 44 by electrical wiring, and the ECU 10 controls the addition valve 42 and the pump 44.

While the internal combustion engine 1 is operating, the ECU 10 performs a reducing agent addition control to supply reducing agent to the SCR catalyst 31 in order to reduce NOx in the exhaust gas passing through the SCR catalyst 31. In the reducing agent addition control, the ECU 10 causes the pump 44 to operate and causes the addition valve 42 to open to add urea solution to the exhaust gas through the addition valve 42, thereby supplying ammonia serving as reducing agent to the SCR catalyst 31. The quantity of urea solution added to the exhaust gas through the addition valve 42 is determined in accordance with the quantity of NOx discharged from the internal combustion engine 1.

When the internal combustion engine 1 is stopped, the ECU 10 performs suck-back control to return urea solution staying in the addition valve 42 and the urea solution channel 43 back into the tank 41. Since urea solution is added to the exhaust gas through the addition valve 42 while the internal combustion engine 1 is operating, urea solution remains in the addition valve 42 and the urea solution channel 43 at the time when the internal combustion engine 1 is stopped. After the stop of the internal combustion engine 1, heat is transferred from the exhaust passage 2 to the addition valve 42, and consequently the temperature of the addition valve 42 rises temporarily. Therefore, if urea solution remains in the addition valve 42, urea solution is hydrolyzed in the addition valve 42 to produce ammonia, possibly causing corrosion of the addition valve 42. Moreover, there is a possibility that precipitates derived from urea may be produced. In cases where the outside air temperature is low, if urea solution remains in the addition valve 42 and the urea solution channel 43, there is a possibility that the urea solution in the addition valve 42 and the urea solution channel 43 will freeze due to fall of its temperature with the lapse of a certain length of time after the stop of the internal combustion engine 1.

To eliminate the above problem, the ECU 10 is configured to perform the suck-back control after the internal combustion engine 1 is stopped. The suck-back control causes urea solution in the addition valve 42 and the urea solution channel 43 to flow back into the tank 41 to remove the urea solution from inside the addition valve 42 and the urea solution channel 43. In this process, the ECU 10 causes the pump 44 to rotate in the reverse direction and causes the addition valve 42 to open, thereby sucking urea solution into the tank 41 and sucking exhaust gas of the internal combustion engine 1 into the addition valve 42. To prevent ammonia or precipitates from being produced, it is preferred that the suck-back control be performed immediately after the internal combustion engine 1 is stopped. Specifically, it is preferred, for example, that the suck-back control be started at the time when the speed of the internal combustion engine 1 becomes equal to zero. It is not essential to start the suck-back control at the time when the speed of the internal combustion engine 1 becomes equal to zero, but the suck-back control may be started within a certain range of time after the time when the speed of the internal combustion engine 1 becomes equal to zero in which the production of ammonia or precipitates can be prevented, alternatively.

Even though the suck-back control is preformed, a very small quantity of area solution may remain in spaces between components of the addition valve 42 in some cases. At the time when the suck-back control is performed, the temperature of the exhaust gas of the internal combustion engine 1 in the exhaust passage 2 is still high, and the high-temperature exhaust gas flows into the addition valve 42 by the suck-back control. Consequently, the temperature of the addition valve 42 rises. Therefore, there is a possibility that precipitate insoluble in water (e.g. cyanuric acid) may be produced from urea solution. Since no filter is provided upstream of the addition valve 42, there is a relatively large quantity of PM in the exhaust gas in the surroundings of the addition valve 42. Such PM is also sucked into the addition valve 42 by the suck-back control. It has been found that the presence of PM in urea solution makes the particle diameter of precipitates larger.

FIG. 2 shows the result of an experiment conducted to examine how the particle diameter of PM varies depending on the variation in the concentration of PM when PM is mixed in urea solution. In FIG. 2, the horizontal axis represents the logarithm of the particle diameter of PM, and the vertical axis represents the volume frequency. In FIG. 2, three cases in which the concentration of PM is high, medium, and low respectively are shown in comparison. It will be understood from FIG. 2 that the higher the concentration of PM is, the more the aggregation of PM is promoted, or the larger the particle diameter of PM is. Therefore, in the case where the addition valve 42 is arranged upstream of the filter, the quantity of PM sucked into the addition valve 42 by the suck-back control is larger than that in the case where the addition valve 42 is arranged downstream of the filter, and consequently the concentration of PM in the interior of the addition valve 42 is higher and the particle diameter of PM in urea solution is larger than in the case where the addition valve 42 is arranged downstream of the filter.

FIG. 3 shows the result of an experiment conducted to examine how the particle diameter of PM varies depending on the variation in the temperature when PM is mixed in urea solution. In FIG. 3, the horizontal axis represents the logarithm of the particle diameter of PM, and the vertical axis represents the volume frequency. In FIG. 3, a case at room temperature and a case at high temperature are shown in comparison. The case at high temperature is arranged to stand for an assumed situation in which the suck-back control is performed at a time when the temperature of the addition valve 42 is, for example, 120° C., urea solution still remains in spaces between components in the addition valve 42 thereafter, PM is sucked into these spaces, and then the temperature of the addition valve 42 rises to, for example, 140° C. by heat received from the exhaust passage 2. The concentration of PM is the same in both the cases. It will be understood from FIG. 3 that the higher the temperature is, the larger the particle diameter is. The aggregation of PM is promoted by precipitates derived from urea to make the particle diameter of PM larger. In other words, the precipitates derived from urea and PM attract each other to make the particle diameter of the precipitates larger.

Therefore, if the suck-back control is performed immediately after the internal combustion engine 1 is stopped, the concentration of PM in the interior of the addition valve 42 becomes high, and the temperature of the addition valve 42 becomes high, leading to the production of precipitates derived from urea. Moreover, PM and precipitates derived from urea attract each other in the addition valve 42, so that the particle diameter of the precipitates can become larger. If the particle diameter of the precipitates becomes large in this way, there is a possibility that clogging of addition valve 42 and/or abrasion of sliding parts in the addition valve 42 may be caused.

FIG. 4 is a time chart in a case where the suck-back control is performed only once immediately after the internal combustion engine 1 is stopped. The suck-back control shown in FIG. 4 may be regarded to be a conventional suck-back control. In FIG. 4, the fuel injection quantity, the status of suck-back flag, the exhaust gas temperature, and the temperature of the addition valve 42 are shown in order from above. The fuel injection quantity is the quantity of fuel supplied to the internal combustion engine 1 by injection. The suck-back flag is a flag used in sucking-back of urea solution. When the suck-back flag is ON, the pump 44 is rotated in the reverse direction and the addition valve 42 is opened, thereby sucking urea solution back into the tank 41. When the suck-back flag is OFF, urea solution is not sucked back. The exhaust gas temperature is the temperature of the exhaust gas in the surroundings of the addition valve 42. The temperature of the addition valve 42 is the temperature of the front end portion of the addition valve 42.

In FIG. 4, when the internal combustion engine 1 is stopped and the fuel injection quantity becomes equal to 0 at time T1, the suck-back flag changes from OFF to ON. Accordingly, the suck-back control is started at T1. The suck-back flag changes into OFF when the urea solution in the addition valve 42 and the urea solution channel 43 is sucked thoroughly back into the tank 41 by the pump 44. While the internal combustion engine 1 is operating, since urea solution absorbs heat from the addition valve 42 as urea solution is supplied into the exhaust passage 2 through the addition valve 42, the temperature of the addition valve 42 is lower than the exhaust gas temperature. After the internal combustion engine 1 is stopped, the quantity of heat that urea solution absorbs from the addition valve 42 decreases, because the supply of urea solution is stopped. After the internal combustion engine 1 is stopped, the temperature of the addition valve 42 rises temporarily, because the addition valve 42 receives heat from the exhaust gas and the exhaust passage 2. As the suck-back control is performed, high-temperature exhaust gas in the exhaust passage 2 is sucked into the addition valve 42. This also leads to a rise in the temperature of the addition valve 42. Thus, the temperature of the addition valve 42 approaches the exhaust gas temperature.

At time T2, the urea solution in the addition valve 42 and the urea solution channel 43 is sucked thoroughly back into the tank 41 by the pump 44. Thus, the suck-back flag changes from ON to OFF at time T2, and the suck-back control ends. At the time when the suck-back flag changes from ON to OFF, the temperature of the addition valve 42 is still high. As described above, even after the suck-back control has been performed, a small quantity of urea solution still remains in narrow spaces in the addition valve 42, and therefore precipitates are produced due to a rise in the temperature of the addition valve 42 after time T1. Since the urea solution in the addition valve 42 has been sucked back nearly completely by the suck-back process, the quantity of precipitates thus produced is smaller than it would be if the suck-back were not performed. However, in cases where the conventional suck-back control is performed, the particle diameter of the precipitates tend to become larger due to PM sucked into the addition valve 42. Then, there is a possibility that clogging and/or abrasion of the addition valve 42 may be caused by the precipitates.

In this embodiment, the control described below is performed instead of the conventional suck-back control shown in FIG. 4. Specifically, in this embodiment, urea solution in the addition valve 42 and the urea solution channel 43 is not sucked back in its entirety into the tank 41 all at once, but the minimum quantity of urea solution that can prevent the production of ammonia and an increase in the particle diameter of precipitates is sucked back into the tank 41. Then after the lapse of a certain time, the remaining urea solution is sucked back into the tank 41 thoroughly. Thus, urea solution is sucked back into the tank 41 in two separate processes. The first suck-back control for sucking urea solution back into the tank 41 will be referred to as the first control, and the second suck-back control that is performed at a later time with a certain time interval after the first control to suck urea solution remaining in the addition valve 42 and the urea solution channel 42 thoroughly back into the tank 41 will be referred to as the second control.

In this embodiment, in the first control the ECU 10 controls the pump 44 and the addition valve 42 in such a way as to suck a portion of the urea solution in the addition valve 42 and the urea solution channel 43 back into the tank 41. More specifically, the ECU 10 causes the pump 44 to rotate in the reverse direction while keeping the addition valve 42 open to suck back a predetermined quantity of urea solution, and then closes the addition valve 42 and stops the operation of the pump 44. In the second control in this embodiment, the ECU 10 controls the pump 44 and the addition valve 42 in such a way as to suck the entirety of the urea solution remaining in the addition valve 42 and the urea solution channel 43 back into the tank 41. In this embodiment, the ECU 10 functions as the controller according to the present disclosure in performing the first control and the second control.

FIG. 5 is a cross sectional view of the addition valve 42 and the exhaust passage 2 in the neighborhood of the addition valve 42. The addition valve 42 includes a body 100 and a needle 101 provided in the body 100. The needle 101 is driven by an electromagnetic driving unit 102. The electromagnetic driving unit 102 is connected with the ECU 10 by electrical wiring and controlled by the ECU 10. The body 100 has discharge ports 103 that open to the interior of the exhaust passage 2 at its front end. The discharge ports 103 are opened and closed by the needle 101. On the rear end of the body 100, there is provided a connector 104 for connection with the urea solution channel 43. Urea solution flowing through the connector 104 flows through the space inside the body 100 around the needle 101 to reach the discharge ports 103. During the suck-back control, the exhaust gas flows into the interior of the body 100 through the discharge ports 103. The body 100 is provided, on its outer circumference, with a radiator 105 for dissipating heat from the addition valve 42 to the atmosphere. The radiator 105 has a plurality of radiator fins 105A, each of which is a thin plate having a circular shape. The radiator fins 105A are arranged at regular intervals with their surfaces extending perpendicularly to the center axis of the body 100. Thus, the urea solution flowing in the addition valve 42 passes through the radiator 105. While the radiator 105 shown in FIG. 5 has air-cooled radiator fins, water-cooled radiator fins may be employed instead. The urea solution channel 43 has higher corrosion resistance against ammonia than the addition valve 42. While the radiator 105 is provided on the addition valve 42 in this embodiment, the radiator may be provided on the urea solution channel 43 instead. It is not necessary that the radiator 105 be integral with the addition valve 42 or the urea solution channel 43, but the radiator may be provided as a separate component.

If the suck-back control is performed immediately after the internal combustion engine 1 is stopped, the concentration of PM in the interior of the addition valve 42 increases, and the temperature of the addition valve 42 rises. This makes the particle diameter of the precipitates in the addition valve 42 larger, as described above with reference to FIGS. 2 and 3. Such an increase in the particle diameter of the precipitates can cause clogging of the addition valve 42 and/or abrasion of parts inside the addition valve 42. However, if suck-back control is not performed immediately after the internal combustion engine 1 is stopped, urea solution is hydrolyzed in the interior of the addition valve 42 to produce ammonia, which can cause corrosion of the addition valve 42. Moreover, there is a possibility that a large quantity of precipitates derived from urea solution may be produced.

In this embodiment, to address the above problem, the first control is performed to suck the minimum quantity of urea solution that can prevent the production of ammonia and an increase in the particle diameter of precipitates back into the tank 41. Specifically, in this embodiment, urea solution is sucked back up to the position at the tank 41 side end of the radiator 105. This position is indicated as "SUCK-BACK POSITION" in FIG. 5. The temperature of the front end portion of the addition valve 42 or the portion near the discharge ports 103 rises immediately after the internal combustion engine 1 is stopped, because this portion receives heat from the exhaust gas in the exhaust passage 2 and the exhaust passage 2 itself. The heat thus received is transferred through the body 100 toward the tank 41 side of the addition valve 42, in other words toward the rear end of the addition valve 42. Since the radiator 105 is provided in the middle of the course of the heat transfer, the heat transferred from the front end portion of the addition valve 42 is transferred to the radiator 105. Consequently, the heat is dissipated to the atmosphere by the radiator 105. Therefore, the heat is not likely to be transferred to the portion of the addition valve on the tank 41 side of the radiator 105. Therefore, the temperature of the addition valve 42 becomes high in the radiator 105 and its portion closer to the exhaust passage 2 than the radiator 105, but the temperature of the portion of the addition valve 42 closer to the tank 41 than the radiator 105 is lower than this temperature.

FIG. 6 shows relationship between the distance from the front end of the addition valve 42 and the temperature. As shown in FIG. 6, while the temperature of the portion of the addition valve 42 from the front end to the radiator 105 is relatively high, the portion on the tank 41 side of the radiator 105 is low. The temperature of the portion of the addition valve 42 on the tank 41 side of the tank 41 side end of the radiator 105 is lower than a predetermined temperature. The predetermined temperature mentioned above is a temperature at which it is possible that the particle diameter of the precipitates in the addition valve 42 may exceed an allowable range. The allowable range of the particle diameter of the precipitates is determined taking into consideration abrasion and clogging of the addition valve 42 that can be caused. For example, if the particle diameter of the precipitates becomes larger than the diameter of the discharge port of the addition valve 42, clogging of the addition valve 42 will occur. Therefore, the allowable range of the particle diameter of the precipitates is determined as a range smaller than the diameter of the discharge port of the addition valve 42 so that clogging of the addition valve 42 will not be caused. The upper bound of the allowable range of the diameter of the precipitates will also be referred to as a specific particle diameter.

Therefore, by sucking back urea solution at least to a position on the tank 41 side of the radiator 105 in the first control, the production of precipitates and ammonia in the addition valve 42 can be prevented or reduced. In the first control, since the quantity of exhaust gas sucked into the addition valve 42 from the exhaust passage 2 can be limited, the quantity of PM sucked into the addition valve 42 can be reduced. Therefore, even if precipitates are produced, an increase in the particle diameter of the precipitates can be controlled. In this embodiment the quantity of urea solution sucked back into the tank 41 when urea solution is sucked back to the suck-back position corresponds to the predetermined quantity according to the present disclosure. The quantity of sucked-back urea solution is equal to the capacity of the portion of the addition valve 42 from its front end to the tank 41 side end of the radiator 105.

Since the second control is performed at a later time with a certain interval after the end of the first control, the temperature of the exhaust gas and the temperature of the addition valve 42 have become lower by the time when the second control is performed. Therefore, the production of precipitates and an increase in the particle diameter of the precipitates in the addition valve 42 after the second control can be prevented or reduced.

FIG. 7 is a time chart in a case where the first control and the second control are performed according to this embodiment. In FIG. 7, the fuel injection quantity, the status of suck-back flag, the exhaust gas temperature, and the temperature of the addition valve 42 are shown in order from above. When the value of the suck-back flag is 0, the ECU 10 does not perform any control relating to sucking-back of urea solution. When the value of the suck-back flag is 1, the ECU 10 performs the first control. When the value of the suck-back flag is 2, the ECU 10 performs the second control. When the value of the suck-back flag is 3, the ECU 10 maintains the state in which urea solution is sucked back to the "SUCK-BACK POSITION" shown in FIG. 5.

At the time when the internal combustion engine 1 is stopped at time T11, the suck-back flag is set to 1, so that sucking back of urea solution to the "SUCK-BACK POSITION" indicated in FIG. 5 is started. In other words, the first control is started at time T11. The first control continues until time T12. The period from T11 to T12 is a period of time needed to suck urea solution from the front end of the addition valve 42 back to the "SUCK-BACK POSITION" indicated in FIG. 5. During this period from T11 to T12, the temperature of the addition valve 42 rises, because the addition valve 42 receives heat from the exhaust passage 2, and the exhaust gas is sucked into the addition valve 42 during this period.

When the first control ends at time T12, the suck-back flag is set to 3. Then, the state in which urea solution is sucked back to the "SUCK-BACK POSITION" indicated in FIG. 5 is maintained. In this state, the exhaust gas does not flow into the additional valve 42 any longer, and PM is not sucked into the additional valve 42 consequently. Thus, the quantity of PM flowing into the addition valve 42 when the temperature thereof is high can be made smaller. Therefore, even if precipitates are produced in the addition valve 42, the particle diameter of the precipitates can be prevented from increasing. When the value of the suck-back flag is 3, the temperature of the exhaust gas and the temperature of the addition valve 42 decreases gradually. When the temperature of the exhaust gas becomes equal to or lower than the predetermined temperature at time T13, the suck-back flag is set to 2. Consequently, the second suck-back control is started at time T13.

Thereafter, when the urea solution in the addition valve 42 and the urea solution channel 43 is sucked thoroughly back into the tank 41 at time T14, the suck-back flag is set to 0, and the second control is terminated. During the period from T13 to T14, since the exhaust gas temperature is equal to or lower than the predetermined temperature, the particle diameter of the precipitates does not increase even if PM in the exhaust gas is sucked into the addition valve 42. During the period from T12 to T13, the concentration of PM in the exhaust gas decreases because PM in the exhaust passage 2 adheres to the wall surface of the exhaust passage 2. Therefore, even if the exhaust gas is sucked into the addition valve 42 after time T13, an increase in the particle diameter of the precipitates can be prevented thanks to the low concentration of PM.

FIG. 8 is a flow chart of the process of the first control and the second control according to this embodiment. This process is executed by the ECU 10 at predetermined time intervals.

In step S101, the ECU 10 determines whether or not the internal combustion engine 1 is stopped. In step S101, if the engine speed is 0, the ECU 10 determines that the internal combustion engine 1 is stopped. The first control and the second control are performed after the internal combustion engine 1 is stopped. In step S101, the ECU 10 determines whether or not a precondition for performing the first control and the second control is met. If the determination made in step S101 is affirmative, the process proceeds to step S102. If the determination made in step S101 is negative, the process proceeds to step S112. In step S112, the reducing agent addition control described above is carried out.

In step S102, the ECU 10 determines whether or not the first control is unfinished. In this step S102, it is determined whether or not it is necessary to start the first control or to continue the first control. The ECU 10 determines that the first control is unfinished if the first control has not been performed after the stop of the internal combustion engine 1 or the first control is being performed at the present time. The ECU 10 memorizes whether or not the first control has been performed after the stop of the internal combustion engine 1 and whether or not the first control is being performed at the present time. If the determination made in step S102 is affirmative, the process proceeds to step S103. If the determination made in step S102 is negative, the process proceeds to step S106.

In step S103, the ECU 10 starts or continues the first control. Specifically, if the first control has not been started, the ECU 10 starts the first control. If the first control has already been started, the ECU 10 continues the first control. In the first control, the ECU 10 causes the pump 44 to rotate in the reverse direction and causes the addition valve 42 to open. After the processing of step S103 is finished, the process proceeds to step S104.

In step S104, the ECU 10 determines whether or not the duration of the first control (i.e. the length of time over which the first control has been performed) is equal to or longer than a first predetermined time. The duration of the first control is counted by the ECU 10. The first predetermined time is a length of time that is required to suck urea solution in the addition valve 42 to the tank 41 side end of the radiator 105. The first predetermined time as such is determined in advance by, for example, an experiment or simulation and memorized in the ECU 10. In this step S104, the ECU 10 determines whether or not the sucking-back of urea solution to the "SUCK-BACK POSITION" indicated in FIG. 5 is finished. The first predetermined time is, in other words, a length of time that is required for the quantity of urea solution sucked back into the tank 41 to reach a quantity (predetermined quantity) equal to the quantity of urea solution stored in the portion in the addition valve 42 from its front end to the tank 41 side end of the radiator 105 (namely, the capacity of the portion of the addition valve 42 from its front end to the tank 41 side end of the radiator 105). In other words, in this step S104, the ECU 10 determines whether or not the quantity of urea solution sucked back into the tank 41 reaches the predetermined quantity. If the determination made in step S104 is affirmative, the process proceeds to step S105. If the determination made in step S104 is negative, the process according to the flow chart in FIG. 8 is terminated this time.

In step S105, the ECU 10 terminates the first control. Specifically, the ECU 10 causes the pump 44 to stop its rotation in the reverse direction and causes the addition valve 42 to close. Then, the process proceeds to step S106.

In step S106, the ECU 10 retrieves the exhaust gas temperature. Specifically, the ECU 10 retrieves the exhaust gas temperature measured by the temperature sensor 11. Since the heat capacity of the front end portion of the addition valve 42 is relatively small, the exhaust gas temperature and the temperature of the front end portion of the addition valve 42 are assumed to be equal at this time. Therefore, it may be considered that the temperature of the front end portion of the addition valve 42 is obtained in this step S106. After the processing of step S106 is finished, the process proceeds to step S107.

In step S107, the ECU 10 determines whether or not the exhaust gas temperature is equal to or lower than the predetermined temperature. By this step S107, it is determined whether or not the particle diameter of the precipitates in the addition valve 42 will be kept within the allowable range even if the second control is performed. If the determination made in step S107 is affirmative, the process proceeds to step S108. If the determination made in step S107 is negative, the process according to the flow chart in FIG. 8 is terminated this time. Therefore, the second control is not performed until the exhaust gas temperature becomes equal to or lower than the predetermined temperature.

In step S108, the ECU 10 starts or continues the second control. Specifically, if the second control has not been started, the ECU 10 starts the second control. If the second control has been already started, the ECU 10 continues the second control. In the second control, the ECU 10 causes the pump 44 to rotate in the reverse direction and causes the addition valve 42 to open. After the processing of step S108 is finished, the process proceeds to step S109.

In step S109, the ECU 10 determines whether or not the duration of the second control (i.e. the length of time over which the second control has been performed) is equal to or longer than a second predetermined time. The duration of the second control is counted by the ECU 10. The second predetermined time is a length of time that is required to suck the urea solution remaining in the addition valve 42 and the urea solution channel 43 after the predetermined quantity of urea solution has been sucked back into the tank 41 thoroughly into the tank 41. The second predetermined time as such is determined in advance by, for example, an experiment or simulation and memorized in the ECU 10. In this step S109, the ECU 10 determines whether or not sucking-back of urea solution from the "SUCK-BACK POSITION" indicated in FIG. 5 is finished. In other words, the ECU 10 determines whether or not the quantity of urea solution sucked back into the tank 41 reaches a quantity equal to the quantity of urea solution stored between the tank 41 side end of the radiator 105 of the addition valve 42 and the tank 41 (namely, the capacity of the portion between the tank 41 side end of the radiator 105 of the addition valve 42 and the tank 41). If the determination made in step S109 is affirmative, the process proceeds to step S110. If the determination made in step S109 is negative, the process according to the flow chart in FIG. 8 is terminated this time.

In step S110, the ECU 10 terminates the second control. Specifically, the ECU 10 causes the pump 44 to stop its rotation in the reverse direction and causes the addition valve 42 to close. After the processing of step S110 is finished, the process proceeds to step S111. In step S111, the ECU 10 executes the termination processing for the process according to the flow chart in FIG. 8. The termination processing is the processing of disabling the execution of this process until the internal combustion engine 1 is started next time. The execution of the termination processing by the ECU 10 prevents this process according to the flow chart in FIG. 8 from being executed until the internal combustion engine 1 is started next time.

In this embodiment as described above, a minimum necessary quantity of urea solution is sucked back into the tank 41 by the first control so as to bring urea solution away from the high temperature portions of the addition valve 42. Thus, the production of ammonia or precipitates in the interior of the addition valve 42 can be prevented or reduced. Moreover, since the quantity of PM sucked into the addition valve 42 while the exhaust gas temperature is high is made smaller, an increase in the particle diameter of precipitates can be controlled even if precipitates are produced. Since the second control is performed after the exhaust gas temperature becomes equal to or lower than the predetermined temperature, the particle diameter or the precipitates can be prevented from increasing. Therefore, clogging and abrasion of the addition valve 42 can be prevented from being caused. Moreover, since urea solution is removed from the interior of the addition valve 42 and the urea solution channel 43 by performing the second control, freezing of urea solution in the interior of the addition valve 42 or the urea solution channel 42 can be prevented.

While in this embodiment urea solution is sucked back to the tank 41 side end of the radiator 105 by the first control, urea solution may be sucked back to a position closer to the tank 41 than the tank 41 side end of the radiator 105 alternatively. For example, by the first control urea solution may be sucked back to the tank 41 side end of the connector 104 or the rear end of the addition valve 42. If ammonia is produced in the addition valve 42, there is a possibility that corrosion may be caused in interior of the addition valve. Sucking urea solution back to the rear end of the addition valve 42 can prevent the production of ammonia in the addition valve 42. Therefore, corrosion can be prevented from being caused in the interior of the addition valve 42. In this case, the quantity of urea solution sucked back into the tank 41 when urea solution is sucked back to the rear end of the addition valve 42, which is equal to the capacity of the addition valve 42, corresponds to the predetermined quantity according to the present disclosure. Even if ammonia is produced in the urea solution channel 43, corrosion of the urea solution channel 43 is prevented because the urea solution channel 43 has higher corrosion resistance against ammonia than the addition valve 42. The position up to which urea solution is to be sucked back by the first control is not limited to the above, but it may be a position closer to the tank 41 than the tank 41 side end of the radiator 105. While in this embodiment the radiator 105 is provided on the addition valve 42, the radiator 105 may be provided on the urea solution channel 43 instead. In this case also, urea solution is to be sucked back to the tank 41 side end of the radiator 105 by the first control.

In this embodiment, the ECU 10 may determine the time to start the second control on the basis of the exhaust gas temperature at the time when the internal combustion engine 1 is stopped. The change with time of the exhaust gas temperature after the time when the internal combustion engine 1 is stopped depends on the exhaust gas temperature at the time when the internal combustion engine 1 is stopped. Therefore, the time taken for the exhaust gas to fall to or below the predetermined temperature can be estimated from the exhaust gas temperature at the time when the internal combustion engine 1 is stopped. The temperature of the addition valve 42 after the time when the first control ends changes in the same manner as the exhaust gas temperature. Therefore, if relationship between the exhaust gas temperature at the time when the internal combustion engine 1 is stopped and the length of time from the stop of the internal combustion engine 1 to the time to start the second control is determined in advance by an experiment or simulation and stored in the ECU 10, the time to start the second control can be determined on the basis of the exhaust gas temperature at the time when the internal combustion engine 1 is stopped.

FIG. 9 is a flow chart of the process of the first control and the second control in the case where the time to start the second control is determined on the basis of the exhaust gas temperature at the time when the internal combustion engine 1 is stopped. This process is executed by the ECU 10 at predetermined time intervals. The steps in this process in which the processing same as the processing in the above-described process according to the flow chart in FIG. 8 is performed are denoted by the same reference signs and will not be described further.

In the process according to the flow chart in FIG. 9, if the determination made in step S101 is affirmative, the process proceeds to step S201. In step S201, the ECU 10 determines whether or not the processing of step S201 is executed for the first time. In other words, in this step S201 it is determined whether or not this process according to the flow chart in FIG. 9 is executed for the first time after the internal combustion engine is stopped. Whether or not this process has been executed after the stop of the engine is memorized in the ECU 10. In other words, the fact that the processing of step S201 has been executed for the first time is memorized in the ECU 10. The memorized fact may be reset at the time when the engine is started or in step S111. In this process, it is necessary to retrieve the exhaust gas temperature at the time when the internal combustion engine 1 is stopped. For this reason, it is determined in step S201 whether or not it is immediately after the stop of the internal combustion engine 1 now. If the determination made in step S201 is affirmative, the process proceeds to step S202. If the determination made in step S201 is negative, the process proceeds to step S102.

In step S202, the ECU 10 retrieves the exhaust gas temperature at the time when the internal combustion engine 1 is stopped. In other words, the exhaust gas temperature at the time when this process is executed for the first time after the internal combustion engine 1 is stopped is regarded as the exhaust gas temperature at the time when the internal combustion engine 1 is stopped. The exhaust gas temperature is measured by the temperature sensor 11. The exhaust gas temperature at the time when the internal combustion engine 1 is stopped is memorized in the ECU 10. After the processing of step S202 is finished, the process proceeds to step S203.

In step S203, the ECU 10 calculates the length of time from the time when the internal combustion engine 1 is stopped to the time to start the second control. Relationship between the exhaust gas temperature at the time when the internal combustion engine 1 is stopped and the length of time from the time at which the internal combustion engine 1 is stopped to the time to start the second control is stored in the ECU 10, and the ECU 10 determines the length of time from the time when the internal combustion engine 1 is stopped to the time to start the second control on the basis of the exhaust gas temperature obtained in step S202. After the processing of step S203 is finished, the process proceeds to step S102.

In the flow chart shown in FIG. 9, if the determination made in step S102 is negative or if the processing of step S105 is finished, the process proceeds to step S204. In step S204, the ECU 10 determines whether or not it is the time to start the second control. In this step S204, it is determined whether or not the time elapsed since the stop of the internal combustion engine 1 has reached the length of time calculated in step S203. The time elapsed since the time at which the internal combustion engine 1 is stopped is counted by the ECU 10. If the determination made in step S204 is affirmative, the process proceeds to step S108. If the determination made in step S204 is negative, the process according to the flow chart in FIG. 9 is terminated this time. As described above, the time to start the second control may be determined on the basis of the exhaust gas temperature at the time when the internal combustion engine 1 is stopped. It is preferred in this embodiment that the second control be started after the exhaust gas temperature decreases to or below the predetermined temperature. However, so long as there is a certain time interval between the end of the first control and the start of the second control, the exhaust gas temperature at the time of start of the second control becomes lower, and an increase in the particle diameter of the precipitates can be prevented or reduced.

Second Embodiment

A second embodiment will be described. In the second embodiment, if there is a possibility that the particle diameter of the precipitates may exceed the allowable range during the period between the end of the first control and the start of the second control, the ECU 10 causes the addition valve 42 to inject urea solution into the exhaust passage 2.

Even if the first control has been performed, a very small quantity of urea solution may remain in spaces between components of the addition valve 42 in some cases. At the time when the first control is performed, the temperature of the exhaust gas of the internal combustion engine 1 in the exhaust passage 2 is still high, and high-temperature exhaust gas flows into the addition valve 42 by the first control. During the first control, PM in the exhaust passage 2 is also sucked into the addition valve 42. Therefore, if the first control is performed immediately after the internal combustion engine 1 is stopped, the concentration of PM in the interior of the addition valve 42 becomes high, and the temperature of the addition valve 42 becomes high. In consequence, if precipitates derived from urea are produced, PM and the precipitates derived from urea attract each other in the interior of the addition valve 42. Then, it is possible that the particle diameter of the precipitates may increase to exceed the allowable range before the second control is started.

In this embodiment, if there is a possibility that the particle diameter of precipitates may exceed the allowable range after the first control is performed, a quantity of urea solution larger than the predetermined quantity is discharged from the tank 41 to the urea solution channel 43, thereby injecting urea solution into the exhaust passage 2 through the addition valve 42. Thereby, the precipitates in the interior of the addition valve 42 are discharged to the exhaust passage 2 by urea solution. Flowing urea solution through the addition valve 42 can decrease the temperature of the addition valve 42, thereby preventing or reducing the production of precipitates and an increase in the particle diameter of the precipitates afterward. Then, after urea solution is supplied into the exhaust passage 2, the first control is performed again to suck back the minimum quantity of urea solution that can prevent the production of ammonia and an increase in the particle diameter of the precipitates. A control according to this embodiment performed by the ECU 10 to discharge urea solution from the tank 41 to the addition valve 42 after the first control has been performed will be hereinafter referred to as the third control or sweeping control.

As above, after the first control for sucking urea solution back into the tank 41 is performed, the third control is performed to discharge urea solution from the tank 41 to supply urea solution into the exhaust passage 2. Thereby, the precipitates in the interior of the addition valve 42 is discharged to the exhaust passage 2 by urea solution. After the third control is performed, the first control is performed again. Thereby, the production of ammonia in the addition valve 42 and an increase in the particle diameter of the precipitates can be prevented or reduced. Since the third control and the first control succeeding thereto are performed every time the particle diameter of the precipitates may exceed the allowable range, they may be performed more than once. In this embodiment, the ECU 10 functions as the controller according to the present disclosure in performing the third control and thereafter performing the first control.

FIG. 10 is a time chart in the case where the first control, the second control, and the third control are performed according to this embodiment. In FIG. 10, the fuel injection quantity, the status of suck-back flag, the status of sweep flag, the elapsed time, the exhaust gas temperature, and the temperature of the addition valve 42 are shown in order from above. When the value of the sweep flag is 0, the ECU 10 does not perform the third control. When the value of the sweep flag is 1, the ECU 10 performs the third control. The elapsed time is the time elapsed from the time when the suck-back flag changed from 0 to 1. The elapsed time is reset at the time when the suck-back flag changed from 0 to 1.

At the time when the internal combustion engine 1 is stopped at time T21, the suck-back flag is set to 1. Then, the predetermined quantity of urea solution is sucked back into the tank 41, and urea solution is sucked back to the "SUCK-BACK POSITION" indicated in FIG. 5. In other words, the first control is started at time T21. The first control continues until time T22. The period from T21 to T22 is a period of time needed to such urea solution back to the "SUCK-BACK POSITION" indicated in FIG. 5. During this period from T21 to T22, the temperature of the addition valve 42 rises, because the addition valve 42 receives heat from the exhaust passage 2 and the exhaust gas is sucked into the addition valve 42 during this period. During the period from T21 to T22, the value of the suck-back flag is 1, and the elapsed time increases.

When the first control ends at time T22, the suck-back flag is set to 3. Then, the state in which urea solution is sucked back to the "SUCK-BACK POSITION" indicated in FIG. 5 is maintained. During the time in which the value of the suck-back flag is 3, the elapsed time increases. The elapsed time reaches a predetermined time at time T23. This predetermined time is determined in advance as such a time that the particle diameter of precipitates produced from the urea solution remaining in the addition valve 42 will exceed the allowable range if the elapsed time reaches the predetermined time. The predetermined time as such is determined in advance by, for example, an experiment or simulation.

Therefore, at time T23, the suck-back flag is set to 0, and the sweep flag is changed from 0 to 1. In other words, the third control is started at time T23. At time T24, urea solution is injected into the exhaust passage 2 through the addition valve 42, and the sweep flag is changed to 0. In other words, the third control ends at time T24. The time T24 is determined in a similar manner as with the time T22. Specifically, in cases where the pump 44 is operated by a constant electrical power (or at a constant rotational speed), the time taken for urea solution to be brought from the "SUCK-BACK POSITION" indicated in FIG. 5 to the discharge ports of the addition valve 42 is substantially constant. If this time is determined in advance by, for example, an experiment or simulation, the length of time from T23 to T24 is determined. Alternatively, a flowmeter that measures the flow rate of urea solution may be provided in the tank 41, and the time T24 may be determined as the time at which the integrated value of the flow rate of urea solution measured by the flowmeter reaches the quantity that causes injection of urea solution out of the addition valve 42.

As the sweep flag changes from 1 to 0 at time T24, the suck-back flag changes from 0 to 1, so that the first control is started again. The elapsed time is reset at time T24, and count of the elapsed time is restarted. At time T25, the suck-back flag changes from 1 to 3, and the first control ends. While the elapsed time increases since time T24, the exhaust gas temperature becomes lower than the predetermined temperature at time T26, before the elapsed time reaches the predetermined time. At this time T26, the suck-back flag changes from 3 to 2, and the second control is started. When the urea solution in the addition valve 42 and the urea solution channel 43 is sucked back into the tank 41 thoroughly at time T27, the suck-back flag is set to 0, and the second control ends.

While in the case represented by the time chart in FIG. 10 the third control is performed only once, the third control and the first control may be performed repeatedly every time the elapsed time reaches the predetermined time.

FIG. 11 is a flow chart of the process of the first control, the second control, and the third control according to this embodiment. This process is executed by the ECU 10 at predetermined intervals. The steps in this process in which the processing same as the processing in the above-described process according to the flow chart in FIG. 8 is performed are denoted by the same reference signs and will not be described further. Moreover, some steps (steps 102 to S106) in this process in which the processing same as the processing in the above-described process according to the flow chart in FIG. 8 is performed are not shown in FIG. 11.

In the flow chart shown in FIG. 11, the processing of steps S101 through S107 is the same as that in the flow chart shown in FIG. 8 or FIG. 9. In this embodiment, if the determination made in step S107 is negative, the process proceeds to step S301. In step S301, the ECU 10 obtains the elapsed time. In this step S301, the elapsed time during the time in which the exhaust gas temperature is higher than the predetermined temperature is obtained. The elapsed time is counted by the ECU 10. After the processing of step S301 is finished, the process proceeds to step S302.

In step S302, the ECU 10 determines whether or not the elapsed time is equal to or longer than the predetermined time. As described above, the predetermined time is determined in advance as such a time that the particle diameter of precipitates produced from the urea solution remaining in the addition valve 42 will exceed the allowable range if the elapsed time reaches the predetermined time. The predetermined time as such is determined in advance by, for example, an experiment or simulation and memorized in the ECU 10. In other words, it is determined by this step S302 whether or not the particle diameter of the precipitates will exceed the allowable range. If the determination made in step S302 is affirmative, the process proceeds to step S303. If the determination made in step S302 is affirmative, the process according to the flow chart in FIG. 11 is terminated this time.

In step S303, the ECU 10 starts or continues the third control. Specifically, if the third control has not been started, the ECU 10 starts the third control. If the third control has already been started, the ECU 10 continues the third control. In the third control, the ECU 10 causes the pump 44 to rotate in the forward direction and causes the addition valve 42 to open. After the processing of step S303 is finished, the process proceeds to step S304.

In step S304, the ECU 10 determines whether or not the duration of the third control (i.e. the length of time over which the third control has been performed) is equal to or longer than a third predetermined time. The duration of the third control is counted by the ECU 10. The third predetermined time is a length of time that is required to inject urea solution out of the addition valve 42. The third predetermined time as such is determined in advance by, for example, an experiment or simulation and memorized in the ECU 10. In this step S304, the ECU 10 determines whether or not discharging of the precipitates from the addition valve 42 has been finished. In other words, the ECU 10 determines whether or not the quantity of urea solution discharged from the tank 41 to the urea solution channel 43 reaches or exceeds a quantity equal to the capacity of the portion from the front end of the addition valve 42 to the tank 41 side end of the radiator 105 of the addition valve 42. If the determination made in step S304 is affirmative, the process proceeds to step S305. If the determination made in step S304 is negative, the process returns to step S303. Thus, the third control continues until discharging of the precipitates from the addition valve 42 is finished.

In step S305, the ECU 10 terminates the third control. Specifically, the ECU 10 causes the pump 44 to stop its forward rotation and causes the addition valve 42 to close. After the processing of step S305 is finished, the process proceeds to step S306. In step S306, the elapsed time is reset. As the third control ends, counting of the elapsed time is restarted. After the processing of step S306 is finished, the process proceeds to step 9307.

In step S307, the ECU 10 sets the status of the first control to "unfinished". Therefore, when the processing of step S102 is executed next time, an affirmative determination will be made, and the first control will be performed. Then, there may be cases where the exhaust gas temperature is higher than the predetermined temperature. Therefore, urea solution is sucked back to the "SUCK-BACK POSITION" Indicated in FIG. 5 to prevent or reduce the production of ammonia.

As above, if the elapsed time reaches or exceeds the predetermined time while the exhaust gas temperature is higher than the predetermined temperature, the third control is performed, and thereafter the first control is performed again. This can prevent the particle diameter of the precipitates in the addition valve 42 from exceeding the allowable range. Therefore, abrasion and clogging of the addition valve 42 can be prevented.

Third Embodiment

In the above-described first and second embodiments, the first control and the second control are performed in any case. However, in cases where the exhaust gas temperature at the time when the internal combustion engine 1 is stopped is lower than the predetermined temperature, the particle diameter of the precipitates in the addition valve 42 does not increase so much even if the urea solution in the addition valve 42 and the area solution channel 43 is sucked thoroughly back into the tank 41. In such cases, it is not necessary to perform the first control. In this third embodiment, it is determined whether or not it is necessary to perform the first control, on the basis of the exhaust gas temperature at the time when the internal combustion engine 1 is stopped. In cases where it is not necessary to perform the first control, the urea solution in the addition valve 42 and the urea solution channel 43 is sucked thoroughly back into the tank 41 at one time. The control by which the urea solution in the addition valve 42 and the urea solution channel 43 is sucked thoroughly back into the tank 41 at one time without performing the first control will be referred to as the fourth control. In the case where the first control is not performed, the second control is not performed as a matter of course. In this embodiment, the ECU 10 functions as the controller according to the present disclosure in performing the first control and the fourth control.

FIG. 12 is a flow chart of the process of the first control, the second control, and the fourth control according to this embodiment. This process is executed by the ECU 10 at predetermined intervals. The steps in this process in which the processing same as the processing in the above-described process according to the flow charts in FIGS. 8 and 11 is performed are denoted by the same reference signs and will not be described further. Moreover, some steps in this process in which the processing same as the processing in the above-described process according to the flow charts in FIGS. 8 and 11 is performed are not shown in FIG. 12.

In the flow chart shown in FIG. 12, if the determination made in step S101 is affirmative, the process proceeds to step S401. In step S401, the ECU 10 determines whether or not the fourth control is being performed. If the fourth control is being performed, the process proceeds to step S405 to continue the fourth control. In other words, if the determination made in step S401 is affirmative, the process proceeds to step S405. If the determination made in step S401 is negative, the process proceeds to step S402.

In step S402, the ECU 10 determines whether or not the processing of step S402 is executed for the first time. In other words, in this step S402 it is determined whether or not this process according to the flow chart in FIG. 12 is executed for the first time after the internal combustion engine is stopped. Whether or not this process has been executed after the stop of the engine is memorized in the ECU 10. In this process, it is necessary to obtain the exhaust gas temperature at the time when the internal combustion engine 1 is stopped. For this reason, it is determined in step S402 whether or not it is immediately after the stop of the internal combustion engine 1 now. If the determination made in step S402 is affirmative, the process proceeds to step S403. If the determination made in step S402 is negative, the process proceeds to step S102.

In step S403, the ECU 10 retrieves the exhaust gas temperature at the time when the internal combustion engine 1 is stopped. In other words, the exhaust gas temperature at the time when this process is executed for the first time after the internal combustion engine 1 is stopped is regarded as the exhaust gas temperature at the time when the internal combustion engine 1 is stopped. The exhaust gas temperature is measured by the temperature sensor 11. The exhaust gas temperature at the time when the internal combustion engine 1 is stopped is memorized in the ECU 10. After the processing of step S403 is finished, the process proceeds to step S404.

In step S404, the ECU 10 determines whether or not the exhaust gas temperature is equal to or lower than the predetermined temperature. As described in the description of the first embodiment, the predetermined temperature is a temperature at which it is possible that the particle diameter of the precipitates in the addition valve 42 may exceed an allowable range. By this step S404, it is determined whether or not the particle diameter of the precipitates in the addition valve will be kept within the allowable range even if the fourth control is performed. If the determination made in step S404 is affirmative, the process proceeds to step S405. If the determination made in step S404 is negative, the process proceeds to step S102. The processing of the steps S102 and the subsequent steps is the same as that in the flow chart shown in FIG. 8.

In step S405, the ECU 10 starts or continues the fourth control. Specifically, if the fourth control has not been started, the ECU 10 starts the fourth control. If the fourth control has been already started, the ECU 10 continues the fourth control. In the fourth control, the ECU 10 causes the pump 44 to rotate in the reverse direction and causes the addition valve 42 to open. After the processing of step S405 is finished, the process proceeds to step S406.

In step S406, the ECU 10 determines whether or not the duration of the fourth control (i.e. the length of time over which the fourth control has been performed) is equal to or longer than a fourth predetermined time. The duration of the fourth control is counted by the ECU 10. The fourth predetermined time is a length of time that is required to suck the urea solution in the addition valve 42 and the urea solution channel 43 thoroughly back into the tank 41. The fourth predetermined time as such is determined in advance by, for example, an experiment or simulation and memorized in the ECU 10. Thus, in this step S406, in other words, the ECU 10 determines whether or not the urea solution in the addition valve 42 and the urea solution channel 43 has been sucked back thoroughly. In other words, the ECU 10 determines whether or not the quantity of area solution sucked back into the tank 41 reaches or exceeds a quantity equal to the capacity of the addition valve 42 and the urea solution channel 43. If the determination made in step S406 is affirmative, the process proceeds to step S407. If the determination made in step S406 is negative, the process according to the flow chart in FIG. 12 is terminated this time.

In step S407, the ECU 10 terminates the fourth control. Specifically, the ECU 10 causes the pump 44 to stop its reverse rotation and causes the addition valve 42 to close. After the processing of step S407 is finished, the process proceeds to step S111. In step S111, the ECU 10 executes the termination processing for the process according to the flow chart in FIG. 12 Executing this termination processing prevents this process from being performed until the internal combustion engine 1 is started next time. In this embodiment, whether the first control is to be performed or not is determined on the basis of the exhaust gas temperature at the time when the internal combustion engine 1 is stopped. In the case where the first control is performed, the time to start the second control may be determined on the basis of the exhaust gas temperature at the time when the internal combustion engine 1 is stopped, as described in the description of the first embodiment with reference to FIG. 9.

As described above, in this embodiment, if the exhaust gas temperature at the time when the internal combustion engine 1 is stopped is equal to or lower than the predetermined temperature, the fourth control is performed without performing the first control. Therefore, process can be carried out in a shorter time. This can lead to a reduction in power consumption with the ECU 10.

What is claimed is:

1. An exhaust gas purification apparatus for an internal combustion engine comprising:
an addition valve configured to supply urea solution into an exhaust passage of an internal combustion engine;
a tank configured to contain urea solution;
a urea solution channel configured to connect said addition valve and said tank, through which urea solution flows;
a pump configured to cause urea solution to flow in the urea solution channel;
a selective catalytic reduction NOx catalyst provided in the exhaust passage downstream of said addition valve and configured to remove NOx using urea solution; and
a controller configured to perform, after said internal combustion engine is stopped, a first control by which said pump is caused to operate in such a way as to return urea solution contained in said addition valve and said urea solution channel to said tank by a predetermined quantity and to stop thereafter and to perform a second control by which said pump is caused to operate in such a way as to return urea solution remaining in said addition valve and said urea solution channel thoroughly to said tank, after the lapse of a certain time after the end of the first control.

2. An exhaust gas purification apparatus for an internal combustion engine according to claim 1, wherein said controller further configured to perform said first control on condition that the temperature of the exhaust gas in said exhaust passage at the time when said internal combustion engine is stopped is equal to or higher than a predetermined temperature.

3. An exhaust gas purification apparatus for an internal combustion engine according to claim 2, wherein said controller further configured to start said second control after the temperature of the exhaust gas in said exhaust passage becomes lower than said predetermined temperature after said first control ends.

4. An exhaust gas purification apparatus for an internal combustion engine according to claim 1, wherein said addition valve or said urea solution channel is provided with a radiator that dissipates heat from said addition valve or said urea solution channel, and said controller further configured to set said predetermined quantity in said first control equal to or larger than the capacity of a portion of at least one of said addition valve or said urea solution channel from a front end of said addition valve to the tank side end of said radiator.

5. An exhaust gas purification apparatus for an internal combustion engine according to claim 1, wherein when the time elapsed since the latest start of said first control becomes longer than a time taken for the particle diameter of a precipitate to reach a specific particle diameter during the period from the latest end of said first control to the start of said second control, said controller further configured to perform a third control by which said pump is caused to operate to discharge a quantity of urea solution equal to or larger than said predetermined quantity from said tank to said urea solution channel and thereafter to perform said first control again.

6. An exhaust gas purification apparatus for an internal combustion engine according to claim 1, wherein if the temperature of the exhaust gas in said exhaust passage at the time when said internal combustion engine is stopped is lower than a predetermined temperature, said controller further configured to cause said pump to operate in such a way as to return urea solution remaining in said addition valve and said urea solution channel thoroughly to said tank without performing said first control and said second control.

* * * * *